United States Patent [19]
Leatherwood

[11] Patent Number: 5,103,569
[45] Date of Patent: Apr. 14, 1992

[54] MULTIPURPOSE COMBINATION LEVELING TOOL
[75] Inventor: Lester Leatherwood, Glen, Miss.
[73] Assignee: The Level Corporation, Glen, Miss.
[21] Appl. No.: 730,538
[22] Filed: Jul. 16, 1991

Related U.S. Application Data

[63] Continuation-in-part of Ser. No. 586,966, Sep. 24, 1990, abandoned.
[51] Int. Cl.⁵ .............................................. G01C 9/00
[52] U.S. Cl. .................................... 33/379; 33/391; 33/371; 33/376; 33/384; 33/343
[58] Field of Search ......................... 33/379, 381–385, 33/387, 388, 347, 348, 391, 399, 365, 374–376, 343, 353, 370–373

[56] References Cited
U.S. PATENT DOCUMENTS

| 312,266 | 2/1985 | Gurley | 33/373 |
|---|---|---|---|
| 892,468 | 7/1908 | Unger | 33/391 |
| 2,175,751 | 10/1939 | Fairchild | 33/391 X |
| 2,535,791 | 12/1950 | Fluke | 33/376 X |
| 2,785,477 | 3/1957 | Gregory | 33/373 |
| 2,854,762 | 10/1958 | Wright | 33/348 |
| 3,225,451 | 12/1965 | Olexson et al. | 33/376 X |
| 4,394,799 | 7/1983 | Moree et al. | 33/343 |
| 4,782,597 | 11/1988 | Mills | 33/370 |

FOREIGN PATENT DOCUMENTS

| 0153101 | 9/1983 | Japan | 33/810 |
|---|---|---|---|
| 157078 | 11/1932 | Switzerland | 33/387 |

Primary Examiner—Harry N. Haroian
Attorney, Agent, or Firm—John E. Vandigriff

[57] ABSTRACT

Disclosed is a leveling tool that has three leveling indicators mounted thereon, one of which is removable and usable as a separate tool when bending electrical conduit. A calculator is integrated into the leveling tool for performing calculations during leveling or during the bending of conduit. A phosphorescent liquid is used in the bubble level indicators for low light use.

18 Claims, 5 Drawing Sheets

MULTIPURPOSE COMBINATION LEVELING TOOL

PRIOR APPLICATION

This application is a continuation-in-part of application Ser. No. 586,966, filed Sept. 24, 1990, entitled MULTIPURPOSE COMBINATION LEVELING TOOL, now abandoned.

FIELD OF THE INVENTION

This application relates to levels, and more particularly to a level having removable and replaceable parts, the removed parts useful as a tools separate from the level housing.

BACKGROUND OF THE INVENTION

Bar-type level have been known for may years. Such levels may have a plurality of bubble elements such that horizontal and vertical leveling measurements may be made with the same level. In such levels there may be one bubble element that is parallel to the length of the level, and another bubble element is transverse to the length of the level. Additionally, a bubble element may be angled at a 45° angle to the length of the level. As an additional feature, a bubble element may be rotatable and used in conjunction with a circular scale so that any angle may be measured by rotating the bubble element until the bubble is centered. The angle of the surface against which the level is placed then may be read from the calibrated scale.

U.S. Pat. No. 4,590,682 describes a three element level assembled with two major body pieces and having two fixed bubble elements and one rotatable bubble element that rotates from 0° to 90°.

Prior art levels are functional as a leveling tool, but do not serve, or have the capability of proving multiple functions in a single tool.

SUMMARY OF THE INVENTION

The invention is a combination tool including a three bubble level, or a two bubble and one pendulum level indicator. One of the level bubbles is removable in a tool useful in bending and measuring angles for electrical conduit.

The body of the level is, for example, an injection molded plastic having a polished finish to resist dirt and cutting oils. One end of the housing has a removal part that includes a first bubble element, and a thumb screw transversing a slot. One end of electrical conduit is placed in the slot and the thumb screw holds the bubble element in place while the conduit is being bent to a desired angle.

A second bubble element is mounted in the central region of the level housing, and the bubble element is parallel to the length of the housing.

A third level measuring element if mounted in the end of the housing opposite the first bubble element. This leveling element may be either a bubble element or a pendulum type element. A fixed scale is around the third leveling element. This scale is graduated in degrees. When a bubble element is used, the bubble element is rotatably mounted so that the element may be rotated until the bubble is level. At this time, the incline of the structure or part against which the level housing is placed may be measured by observing the number of degrees rotated to level the bubble element.

The body of the level has studs extending through the body providing four post at the bottom of the level and at opposite ends. These studs are used in conjunction with elastic straps to attach the level to, for example, stainless or aluminum conduit pipe during the bending process, to hold the level to the pipe so that the angles of the bends may be accurately determined.

A second embodiment of the third leveling element is a pendulum. The pendulum is suspended from an axis about which the pendulum is free to rotate. The bottom of the pendulum will, because of gravity, always point downward. When the level housing is placed on an incline, the pendulum will point downward to the graduated scale, indicating the amount of incline of the level housing.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT

Figure 1:
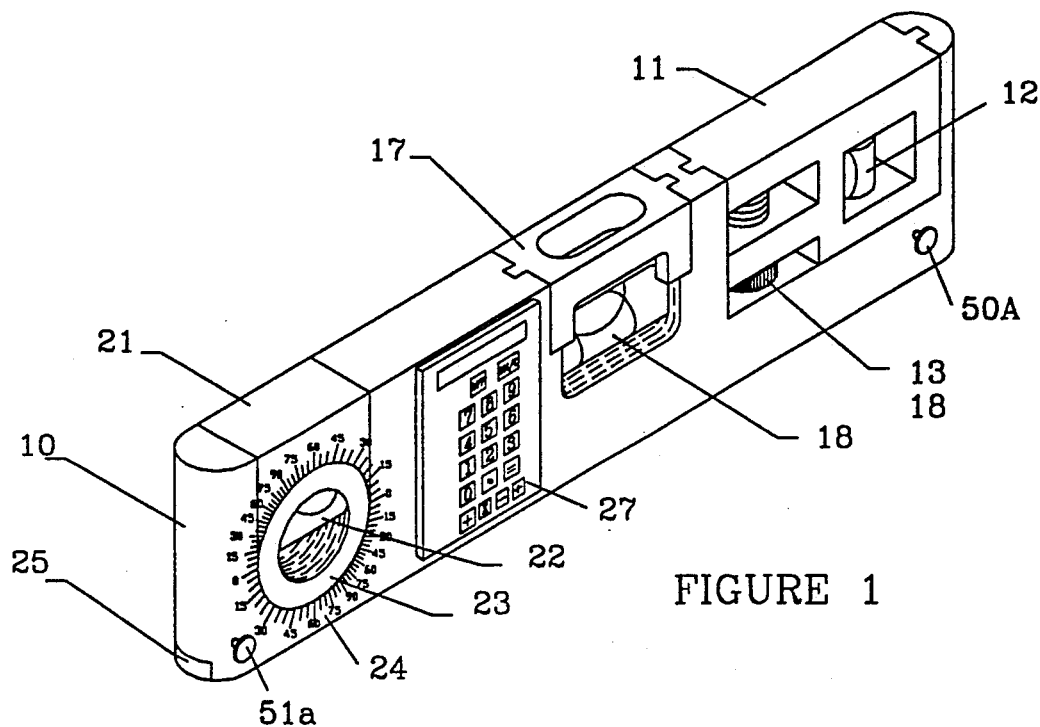
FIG. 1 is an isometric view of one embodiment of the invention.
Figure 2:
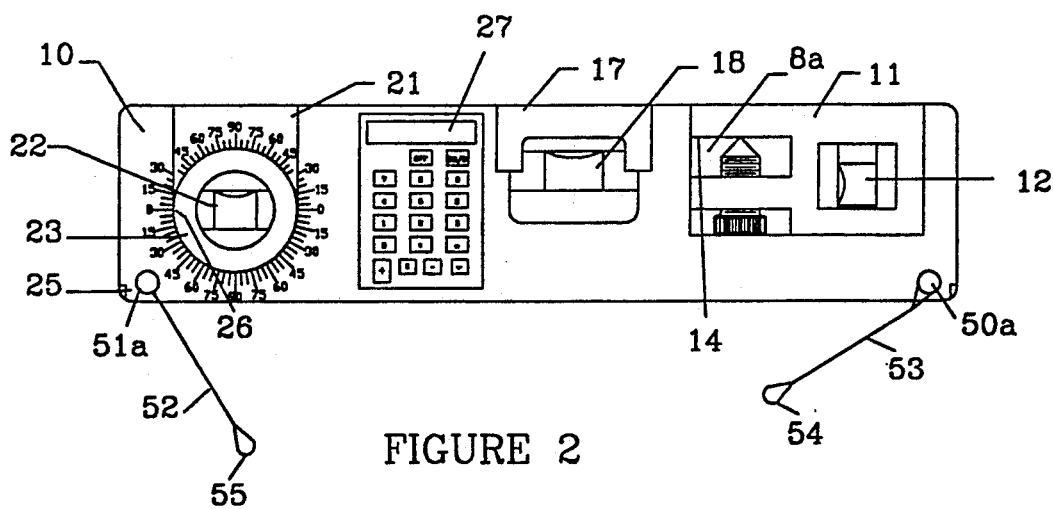
FIG. 2 is a front view of the embodiment of FIG. 1.

FIGS. 1 and 2 illustrate one embodiment of the invention. Level 9, having a housing 10 is made from, for example, a high impact injection molded plastic that has a polished finish to resist dirt and cutting oils. Three leveling bubbles 12, 18 and 22, are mounted in the level housing 10.

Level bubble 12 is mounted in removable part 11. Tool 11 resides in housing 10 and is aligned therein in slots 15 and 16. Tool 11 has a thumb screw 8 used to clamp metal electrical conduit in slot 8a, and is discussed in more detail below.

Level bubble 18 is centrally mounted in housing 10 and held in place by cap 17. In the event that bubble 18 is broken, it may be replaced by the removal of cap 17. Level bubble 18 is mounted parallel to the length of housing 10.

Level bubble 22 is mounted on the opposite end of housing 10 from bubble 12. Level Bubble 22 is rotatably mounted in ring mount 23. Scale 24, graduated in degrees, surrounds level bubble 22. Ring mount 23 has a pointer mark 26 thereon. When the slope of an incline is to be measured, Level 9 is placed on the incline and ring mount 23 is moved until level bubble 22 is centered, indicating that is it level (or parallel) with respect to the earth. The degree of slope of the incline is then indicated in degrees at the point on scale 24 adjacent to pointer mark 26. Bubble level 22 is interchangeable with a different type of level indicator as discussed below.

A calculator 27 is incorporated into level 9. In making level measurements, or bending electrical conduit pipe, it is necessary to calculate lengths necessary to extend bent pipe before a second or additional bends are made. Calculator 27 is a useful adjunct to level 9 in making numerous calculations. An added feature of calculator is that it may be solar powered to eliminate the need for batteries, allowing a smaller calculator.

Figure 2A:
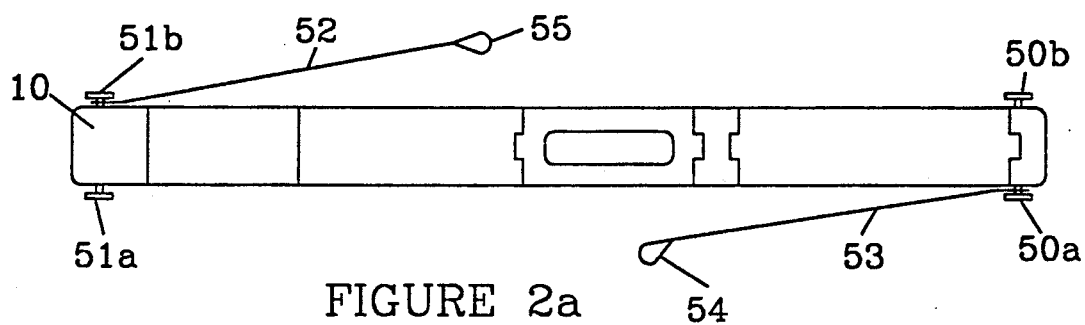
FIG. 2a is a top view of the invention showing the location of the studs and holding straps.

FIG. 2 also shows studs 50a and 51a on the low part of the level body at each end. Studs 50a and 51a extend through the level body 10 providing studs 50b and 51b on the opposite sides of the level body, as illustrated in FIG. 2a. Attached to the studs are elastic straps 52 and 53. Strap 52 is attached to stud 51b on one end and has a loop 55 on the opposite end. Strap 52 is wrapped around an element to which the level is to be attached and loop 55 is looped over stud 51a. In a similar manner strap 53 is attached to stud 50a and is wrapped around an element to which the level is to be attached and loop 54 is placed over stud 50b to secure the level to the element to which the level is to be attached. The end of straps 52 attached to stub 51b and the end of strap 53 attached to stud 50a may be permanently attached or have loops similar to loops 54 and 55 and looped over a respective stud.

Figure 2B:
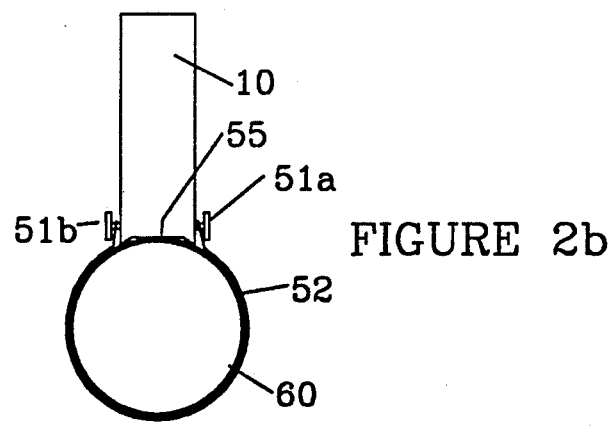
FIG. 2b is an end view of the invention show the level secured to a conduit pipe using studs and elastic straps.

FIG. 2b illustrates level 10 attached to a conduit pipe 60. Strap 52 is attached at its ends to studs 51a and 51b, and strap 52 is wrapped around pipe 60 holding level 10 securely to pipe 60. Level 10 may have a recess 55 in its bottom to conform to the circumference of pipe 60. Recess 55 provides a secure attachment to a conduit pipe so that the level does not roll-off the pipe even when the level is strapped to pipe 60.

Figure 3:
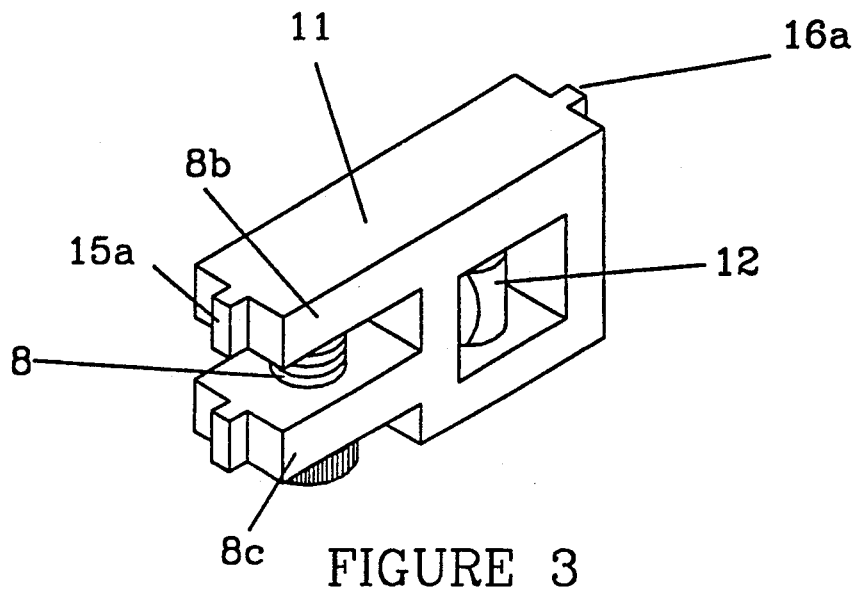
FIG. 3 is an isometric view of the removable bubble element.
Figure 4:
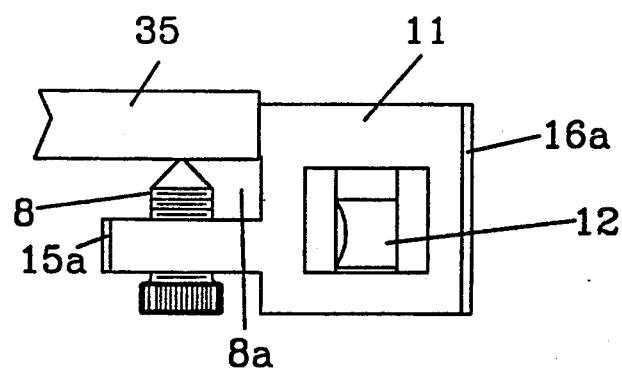
FIG. 4 is a front view of the removable bubble element of FIG. 3.

FIG. 3 is an isometric view of tool 11 as it is when removed from level housing 10. Guides 15a and 16a guide tool 11 in slots 15 and 16, respectively, in housing 10. Tool 11 has bubble level 12 mounted in one end of the tool 11 and a thumb screw 8 mounted in the opposite end. Thumb screw 8 spans slot 8a formed by arms 8b and 8c, and is used to clamp one end of a metal electrical conduit pipe 35 when bending the pipe. Such a device is useful in making compound bends in electrical conduit to ensure that the bends keep each end of the conduit in a common, or vertical plane. FIG. 4 illustrates tool 11 clamped to conduit pipe 35. Pipe 35 has one side of the pipe in slot 8a with the end of thumb screw clamping the conduit to the side of slot 8a.

Figure 5:
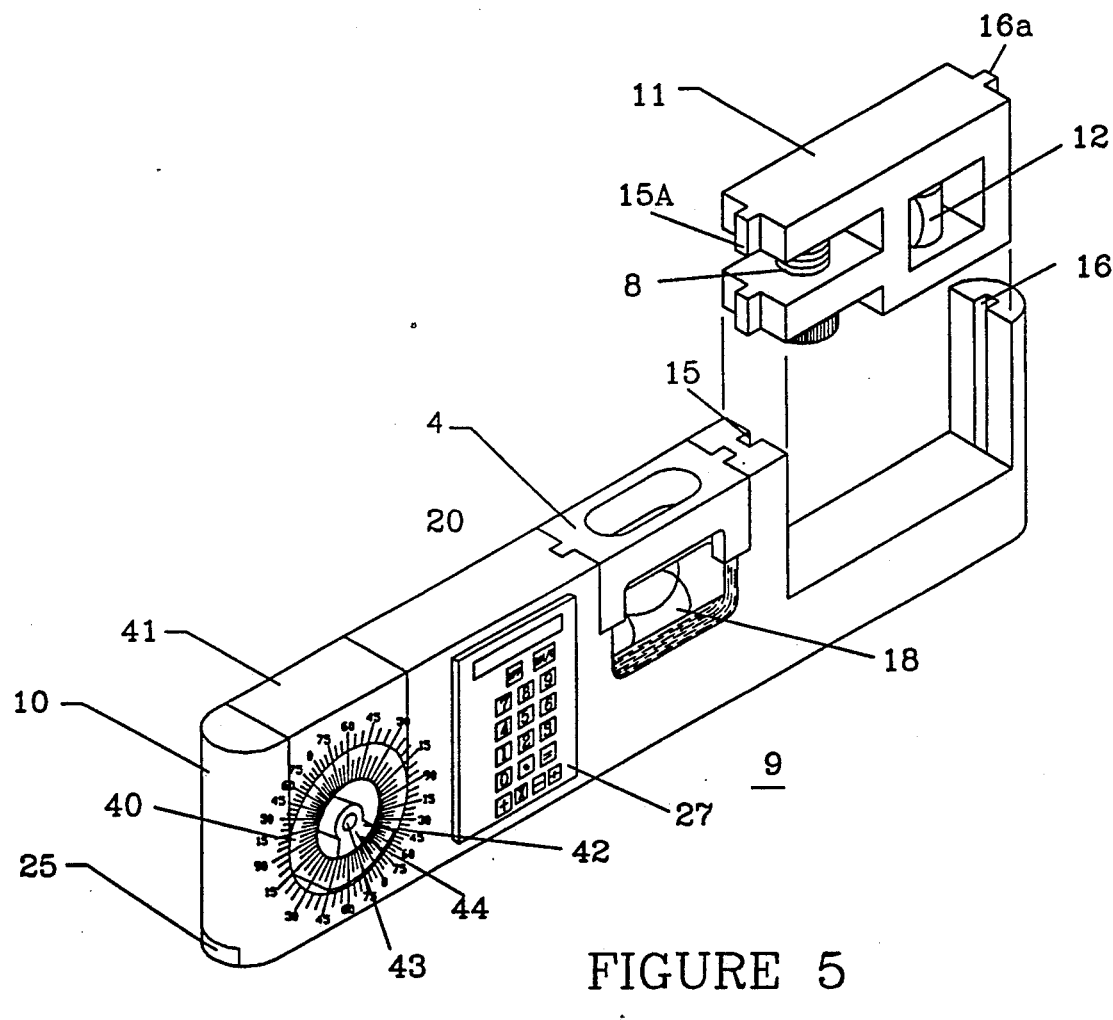
FIG. 5 is an exploded view of FIG. 1 illustrating the removable bubble element and tool.

FIG. 5 is an isometric view of level 9 showing the tool 11 removed from the end of the level. Tool 11 resides in slots 15 and 16 in the end of level 9 and may be used as a level to check vertical measurements. In the event tool 11 is need during the bending of electrical conduit pipe, it may be removed and clamped to the end of a pipe to be bent, as illustrated in FIG. 4.

FIG. 5 also illustrates a pendulum type level assembly 41 mounted in the end of the level 9 opposite tool 11. Pendulum level assembly 41 has a pendulum 42 mounted on pin 43, about which it is free to rotate. On each side of the pendulum 42 is a clear scale 40, 40a, graduated in degrees. As pendulum 42 rotates on pin 43, pointer mark 44 will point to a portion of scale 40, indicating the amount of incline, in degrees, being measured by level 9.

Figure 6:
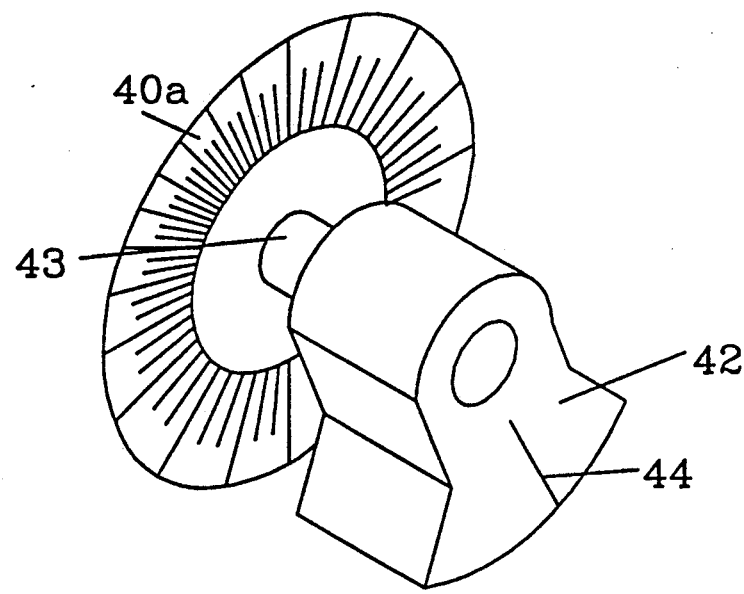
FIG. 6 is an isometric partial view of the pendulum leveling element.
Figure 7:
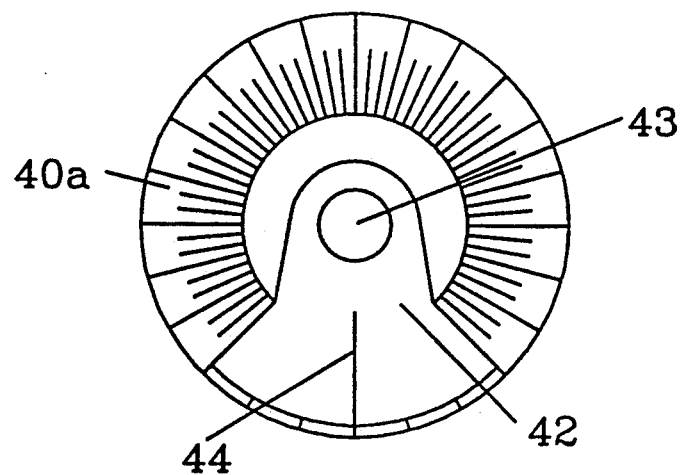
FIG. 7 is a front view of the pendulum element of FIG. 6.

FIG. 6 is an isometric drawing of pendulum 42, with pointer mark 44, mounting pin 43 and clear scale 40a removed from mount 41 to clearly illustrate the internal parts of the pendulum level assembly 41. FIG. 7 is a front view of FIG. 6. Pendulum 42 is free to rotate 360° about pin 43.

In each of FIGS. 1, 2 and 5, a part 25 is illustrated. Part 25 is a rubberized magnetic material mounted along the length of the bottom side of level 9 so that level 9 will adhere to metallic surfaces, the levelness or slope of which is being measured.

Each of the bubbles in levels 12, 18 and 22 may include a phosphorescence liquid that will glow in dark or poorly lighted spaces enabling the uses to make level measurements in minimal light.

What is claimed:

1. The combination of a leveling tool and a conduit bending plane indicator, wherein the conduit bending tool is an integral part of the leveling tool, and useful as a leveling indictor when mounted on, and attached to the leveling tool, comprising:

an injection molded leveling tool main housing having a uniform width along its length, a groove having a radius extending along an edge of the main housing to securely seat the main housing when used as a leveling took, and having a central region and two end regions, one each on each side of said central region, one of said two end regions having a tool mount opening with slots at opposite ends of the opening;

a first removable leveling device mounted in the central region of said main housing;

a second leveling device mounted in a first of said end regions; and a conduit bending plane indicator removably mounted in the tool mounting opening of said main housing and residing in said slots in said tool mounting opening, said conduit bending plane indicator having a vertically mounted bubble indicator, two spaced apart clamping arms, and a thumb screw mounted in one of said arms and extending to the other arm to clamp conduit between the two arms, said conduit bending plane indicator having a width the same as the main housing uniform width;

first and second pairs of studs located at said first and second ends regions of said main housing, each stud, in a pair of studs, located on opposites sides of the housing;

a pair of straps, on e strap attached to each pair of studs to secure the leveling tool to a construction element placed adjacent the groove extending along said main housing; and a calculator in combination with said leveling tool and formed as an integral part of said main housing;

wherein said conduit bending plane indicator is functional as a level indictor in combination with said first leveling device, and functional independent of said first leveling device as a conduit plane indicator, and attachable to the element being measured by the leveling tool.

2. The leveling tool according to claim 1, wherein said second leveling device is removable from the end region in which it is mounted.

3. The leveling tool according to claim 1, wherein the second leveling device is a pendulum type leveling device.

4. The leveling tool according to claim 1, wherein said conduit bending plane indicator is a bubble type leveling device.

5. The leveling tool according to claim 1, wherein the calculator is a solar powered calculator.

6. The leveling tool according to claim 1, wherein the leveling devices include a leveling bubble and have a phosphorescent liquid forming the bubble.

7. The level took according to claim 1, wherein said second bubble level device is rotatable, includes a marker pointer, and has scale around the leveling device to which the pointer marker points indicating the amount of incline measure by the leveling device.

8. The leveling device according to claim 1, wherein each of said first and second pairs of studs extend out two sides of the main housing, and one end of each of the pairs of straps is attached to one stud, and the other end of each strap has a loop thereon to loop over and attached to another end of a respective stud.

9. The leveling device according to claim 1, wherein said strap s are of an elastic material.

10. The leveling device according to claim 1, where said straps have loops on each end of the strap.

11. A combination measuring tool for measuring angles and calculating lengths and angles during bending and installation of electrical conduit utilizing bubble levels and a conduit bending plane indicator, each element of the combination measuring tool being an integral part of a single tool, comprising:
an injection molded leveling tool main housing having a uniform width along its length, a groove having a radius extending along an edge of the main housing to securely seat the main housing when used as a leveling tool, and having a central region and two end regions, one each on each side of said central region, one of said two end regions having a tool mount opening with slots at opposite ends of the opening;
a first leveling device mounted in the central region of said main housing;
a second leveling device mounted in a first of said end regions for measuring angles and giving indications of angular measurements;
a conduit bending plane indicator removably mounted in the tool mounting opening of said main housing and residing in said slots in said tool mounting opening, said conduit bending plane indicator having a vertically mounted bubble indicator, two spaced apart clamping arms, and a thumb screw mounted in one of said arms and extending to the other arm to clamp conduit between the two arms, said conduit bending plane indicator having a width the same as the main housing uniform width;
a calculating device formed in, and as an integral part of said main housing to calculate angles and lengths based on said indications of angular measurements;
first and second pairs of studs located at said first and second ends of said main housing; and
a pair of straps, one strap attached to each pair of studs to secure the leveling tool to a construction element;
wherein said conduit bending plane indicator is functional as a level indicator in combination with said main housing leveling tool, and functional independent of said main housing leveling tool as a conduit plane indicator, and attachable to the element being measured by the leveling tool.

12. The leveling device according to claim 11, wherein each of said first and second pairs of studs extend out two sides of the main housing, and one end of each of the pairs of straps is attached to one stud, and the other end of each strap has a loop thereon to loop over and attached to another end of a respective stud.

13. The leveling device according to claim 11, wherein said straps are of an elastic material.

14. The leveling device according to claim 11, where said straps have loops on each end of the strap.

15. The leveling tool according to claim 11, wherein the second leveling device is a pendulum leveling device mounted in a rotatable ring having a pointer marker.

16. The leveling tool according to claim 11, wherein said second leveling device is a bubble type leveling device mounted in a rotatable ring.

17. The leveling tool according to claim 11, wherein the leveling devices include a leveling bubble and have a phosphorescent liquid forming the bubble.

18. The leveling device according to claim 11, wherein said second leveling device is rotatable, includes a marker pointer, and has scale around the leveling device to which the pointer marker points indicating the amount of incline measure by the leveling device.

* * * * *